United States Patent [19]

Saito et al.

[11] 4,384,352
[45] May 17, 1983

[54] ROTARY RECORDING MEDIUM REPRODUCING APPARATUS

[75] Inventors: Takashi Saito, Ayase; Masafumi Mochizuki, Yamato; Toshio Hirano, Atsugi, all of Japan

[73] Assignee: Victor Company of Japan, Ltd., Yokohama, Japan

[21] Appl. No.: 301,297

[22] Filed: Sep. 11, 1981

[30] Foreign Application Priority Data

Sep. 12, 1980 [JP] Japan .................. 55-130036[U]

[51] Int. Cl.³ .................. G11B 17/04; G11B 3/10
[52] U.S. Cl. .................. 369/77; 360/86; 369/258
[58] Field of Search .................. 369/77, 75, 258; 360/86, 97, 99

[56] References Cited

U.S. PATENT DOCUMENTS 4,352,174  9/1982  Tajima .................. 369/77
4,358,841  11/1982  Carroll et al. .................. 369/77

FOREIGN PATENT DOCUMENTS 2087127  4/1982  United Kingdom .................. 369/77

Primary Examiner—Steven L. Stephan
Attorney, Agent, or Firm—Louis Bernat

[57] ABSTRACT

A rotary recording medium reproducing apparatus reproduces a rotary recording medium accommodated within a case where the case comprises a jacket provided with a space for accommodating the rotary recording medium and an opening for allowing the rotary recording medium to go in and out of the jacket, and a lid member inserted through the opening of the jacket for closing the opening of the jacket. The rotary recording medium reproducing apparatus comprises an inserting opening through which the case is inserted, a turntable for rotating the rotary recording medium, a lid member locking mechanism and rotary recording medium clamping mechanism provided at an innermost part of the reproducing apparatus at an opposite side from the inserting opening with respect to the turntable, where the rotary recording medium clamping mechanism consists of an upper clamping member and a lower clamping member which is at a downwardly inclined rotated position upon non-clamping state and at a horizontal rotational position upon clamping state, an operating mechanism pushed and displaced by the case inserted into the reproducing apparatus, for operating the lid member locking mechanism and the rotary recording medium clamping mechanism, a locking mechanism for locking the operating mechanism at a final displaced position, and a restricting mechanism constructed from a part of the lower clamping member of the rotary recording medium clamping mechanism and a part of the operating mechanism, for restricting the displacing movement of the operating mechanism towards the final displaced position at an intermediate position when the lower clamping member is at the downwardly inclined rotated position.

5 Claims, 7 Drawing Figures

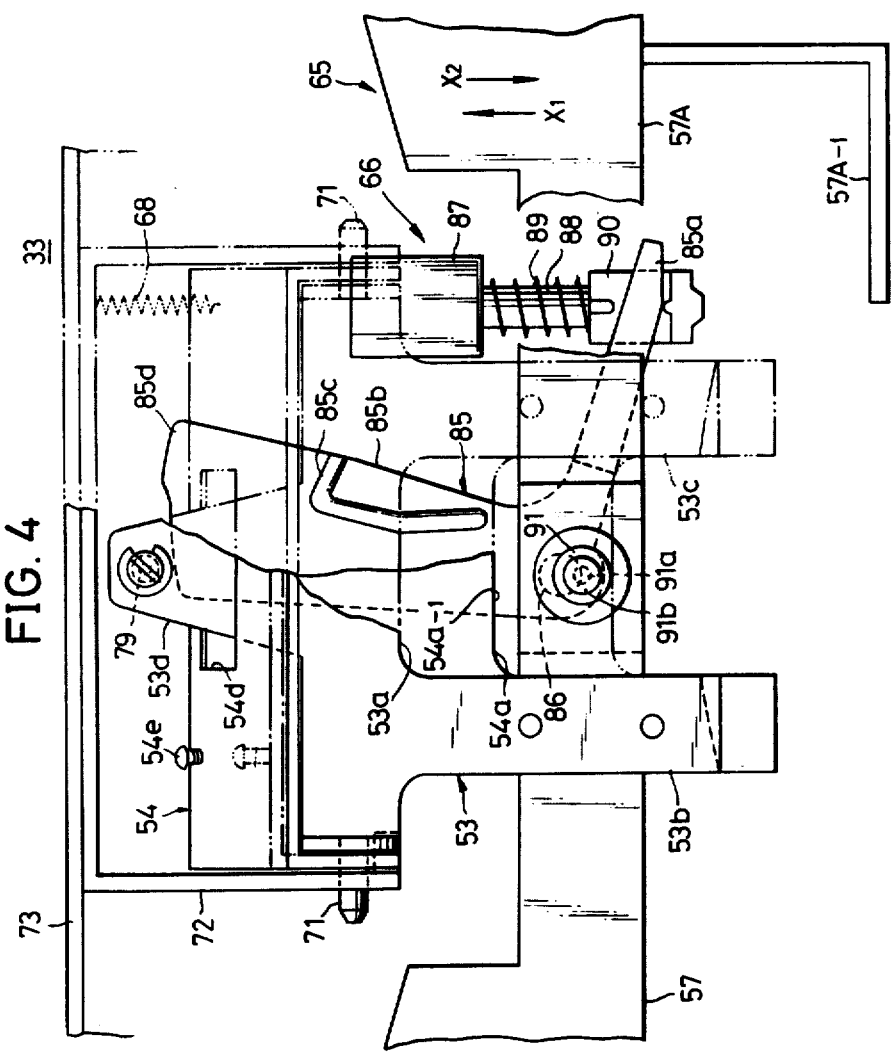

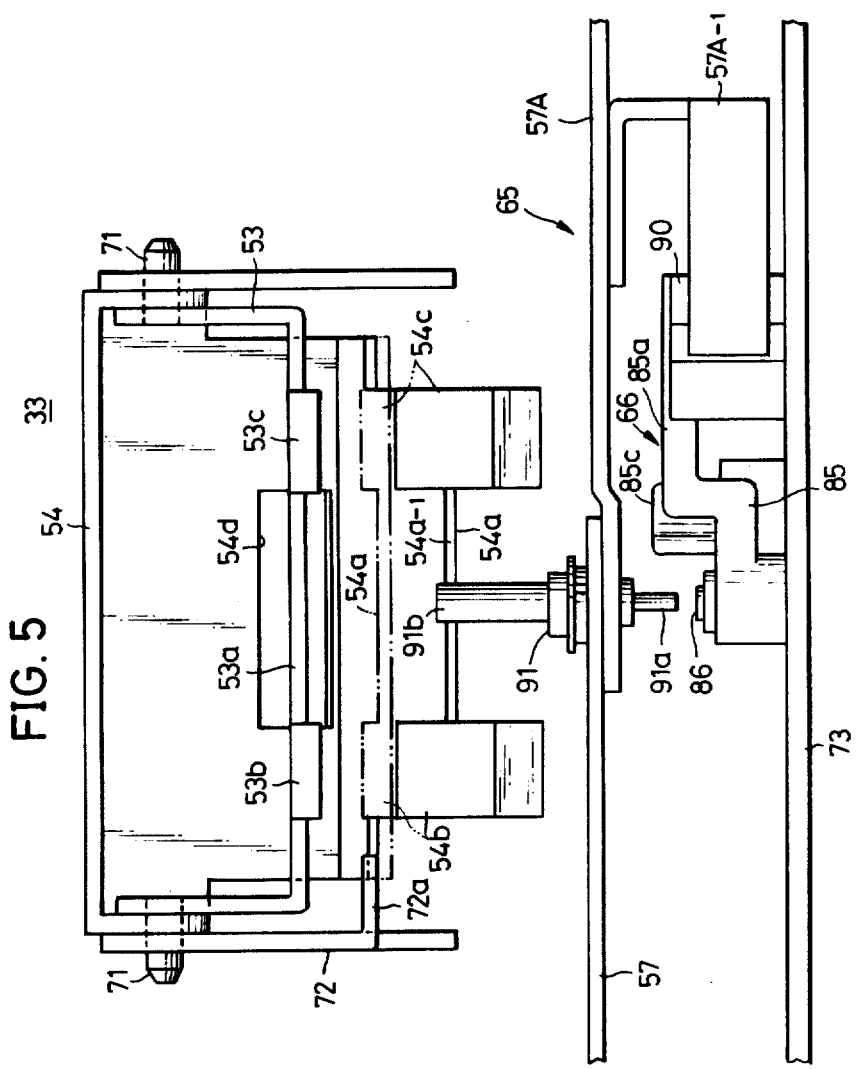

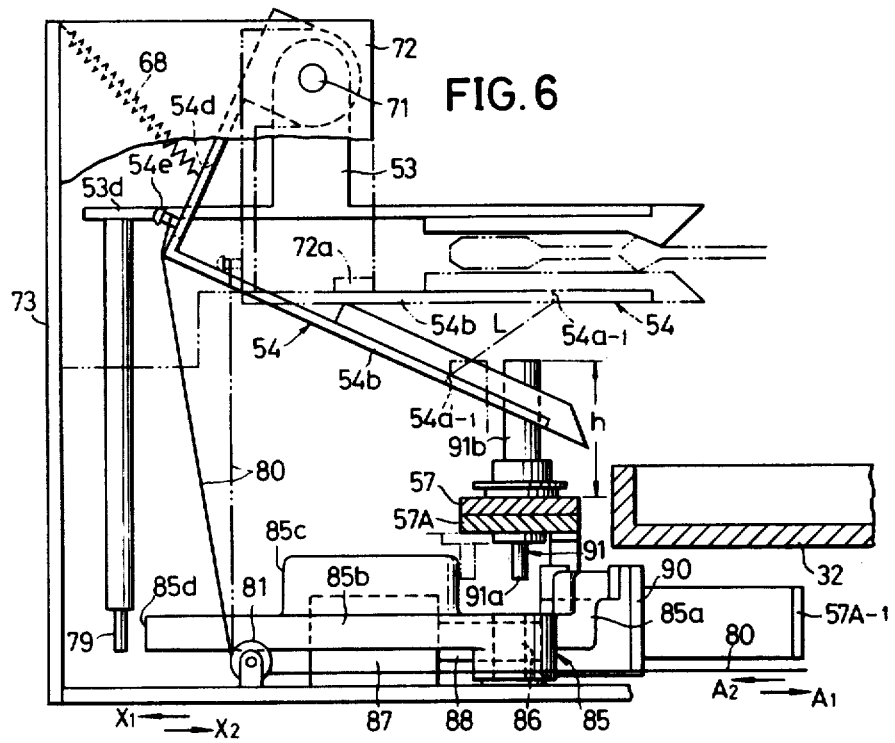
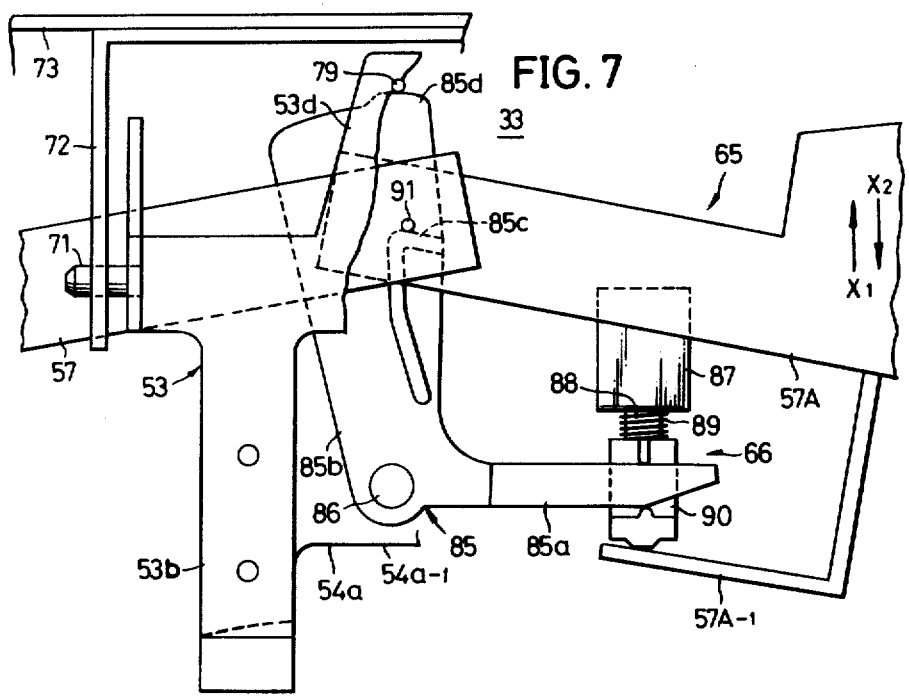

ROTARY RECORDING MEDIUM REPRODUCING APPARATUS

BACKGROUND OF THE INVENTION

The present invention relates to rotary recording medium reproducing apparatuses capable of placing and leaving a rotary recording medium in a state possible for reproduction within the rotary recording medium reproducing apparatus when a jacket (disc case) having a lid for accommodating the rotary recording medium therein is inserted into and then pulled out from within the rotary recording medium reproducing apparatus, and also capable of incasing the rotary recording medium within the jacket so that the rotary recording medium can be obtained outside the rotary recording medium reproducing apparatus together with the jacket, when the empty jacket is inserted into and then pulled out from within the reproducing apparatus. The present invention further and especially relates to the above type of a rotary recording medium reproducing apparatus constructed to limit the movement of the inner mechanisms upon transportation of the reproducing apparatus, by using a part of a lower clamping member of rotary recording medium clamping means.

Conventionally, in an apparatus for reproducing a rotary recording medium (referring to video disc, PCM audio disc, and the like, and hereinafter simply referred to as a disc), there are types of apparatuses in which a disc is reproduced when the disc is loaded upon holding and placing of the disc within the reproducing apparatus, by inserting into and then pulling out a disc case which has a lid and accommodates a disc therein, from within the reproducing apparatus.

As a conventional apparatus of this type, a reproducing apparatus was proposed in a United States patent application Ser. No. 231,868 filed Feb. 5, 1981, entitled "DISC-SHAPED RECORDING MEDIUM REPRODUCING APPARATUS" in which the assignee is the same as that of the present application. This previously proposed reproducing apparatus operates together with a disc case comprising a jacket which has a space for accommodating a disc and an opening for allowing the disc to go in and out of the jacket, and a lid member inserted through the opening of the jacket for closing the opening of the jacket, where the reproducing apparatus comprises an inserting opening through which the case is inserted, a turntable for rotating the disc, disc clamping means for clamping the disc provided at an innermost part on the opposite side from the inserting opening with respect to the turntable, lowering and raising means for lowering the disc to a position where the disc is placed on the turntable from a clamping position where the disc is clamped by the clamping means upon starting of the reproduction and raising the disc to the clamping position from the turntable upon finishing or discontinuing of the reproduction, a reproducing transducer for reproducing and disc placed on the turntable, and moving means for moving the reproducing transducer from a waiting position to a reproducing position with respect to the disc.

In the above proposed reproducing apparatus, in relation to the above disc clamping means, an operating mechanism which is pushed and displaced by the case upon insertion of the case into the reproducing apparatus, for operating the clamping means, and a locking mechanism for locking the above operating mechanism at a final displaced position, are further provided in addition to the above described mechanisms.

In a case where an external shock is applied to the above proposed reproducing apparatus upon transportation of the reproducing apparatus, the parts which are easily displaced are the reproducing transducer and the operating mechanism. The above operating mechanism in particular, is restricted of the position by a spring and a stopper. However, the above spring is forcibly stretched upon insertion of the case into the reproducing apparatus, and the spring force exerted by the spring is set to a small value so that the case inserting operation can be performed by use of a small force. Therefore, although the above operating mechanism is restricted of the position by the spring, the operating mechanism can easily be displaced due to external shock.

When the position of the reproducing transducer is shifted towards the side of the turntable due to the external shock, it becomes impossible to perform a disc loading operation. Moreover, with respect to the operating mechanism, the operating mechanism becomes locked unnecessarily by the above locking mechanism in a case where the operating mechanism is greatly displaced unto the final displaced position. When the operating mechanism becomes locked by the locking mechanism, it becomes impossible to perform the disc loading operation. In a case where the above described state is introduced, a correcting operation must be performed by disassembling the top plate of the reproducing apparatus to correct the states of the inner mechanisms into the correct states. This correcting operation is troublesome to perform, and requires the service of a repairman.

Accordingly, in the above described reproducing apparatus, as a countermeasure against external shock, locking screws were used to rigidly restrict the positions of the reproducing transducer and the operating mechanism at predetermined positions. The above locking screw for locking the reproducing transducer is provided on the upper surface of the reproducing apparatus where it is visible, and accordingly, the locking screw can surely be removed when the reproducing apparatus is operated. However, the locking screw for stabilizing the operating mechanism is provided at the rear surface side of the reproducing apparatus where it does not stand out. Hence, the operator may forget to remove the locking screw for the operating mechanism before the reproducing apparatus is operated. When the above locking screw for the operating mechanism is not removed, the operating mechanism does not operate and the disc cannot be loaded into the reproducing apparatus. Therefore, in this state, there was a problem in that the operator may mistake the reproducing apparatus as an inferior apparatus.

In addition, the above two locking screws must be used to stabilize the reproducing transducer and the operating mechanism, when the reproducing apparatus is to be transported to another place by an automobile and the like. In this case, the user may forget to stabilize the operating mechanism by the above locking screw. When the reproducing apparatus is transported in a state where the locking screw for the operating mechanism is removed, there was a problem in that the operating mechanism may become locked by the locking mechanism as described above.

Furthermore, there was another problem in that when the reproducing apparatus falls down on the floor from a placing table from the resting state, the above locking mechanism may operate to lock the above locking screw for the operating mechanism.

SUMMARY OF THE INVENTION

Accordingly, it is a general object of the present invention to provide a novel and useful rotary recording medium reproducing apparatus in which the above described disadvantages have been overcome.

Another and more specific object of the present invention is to provide a rotary recording medium reproducing apparatus in which the movement of an operating mechanism towards a position where the operating mechanism is locked by a locking mechanism is restricted at an intermediate position, by use of a lower clamping member which inclines towards the downward direction. According to the reproducing apparatus of the present invention, a locking screw with respect to the operating mechanism is not required, and the movement of the operating mechanism towards the locking position upon transportation and the like is positively restricted. Further, the restriction with respect to the operating mechanism can be positively released upon use of the reproducing apparatus.

Other objects and further features of the present invention will be apparent from the following detailed description when read in conjunction with the accompanying drawings.

BRIEF DESCRIPTION OF THE DRAWINGS

FIGS. 4, 5, and 6 are a plan view with a part cut away, a front view, and a side view in a vertical cross section with a part cut away, respectively showing a disc clamping mechanism and an operating mechanism which form an essential part of the reproducing apparatus according to the present invention; and FIG. 7 is a plan view, with a part cut away, showing the mechanism shown in FIG. 4 in a disc clamping state.

DETAILED DESCRIPTION

Figure 1:
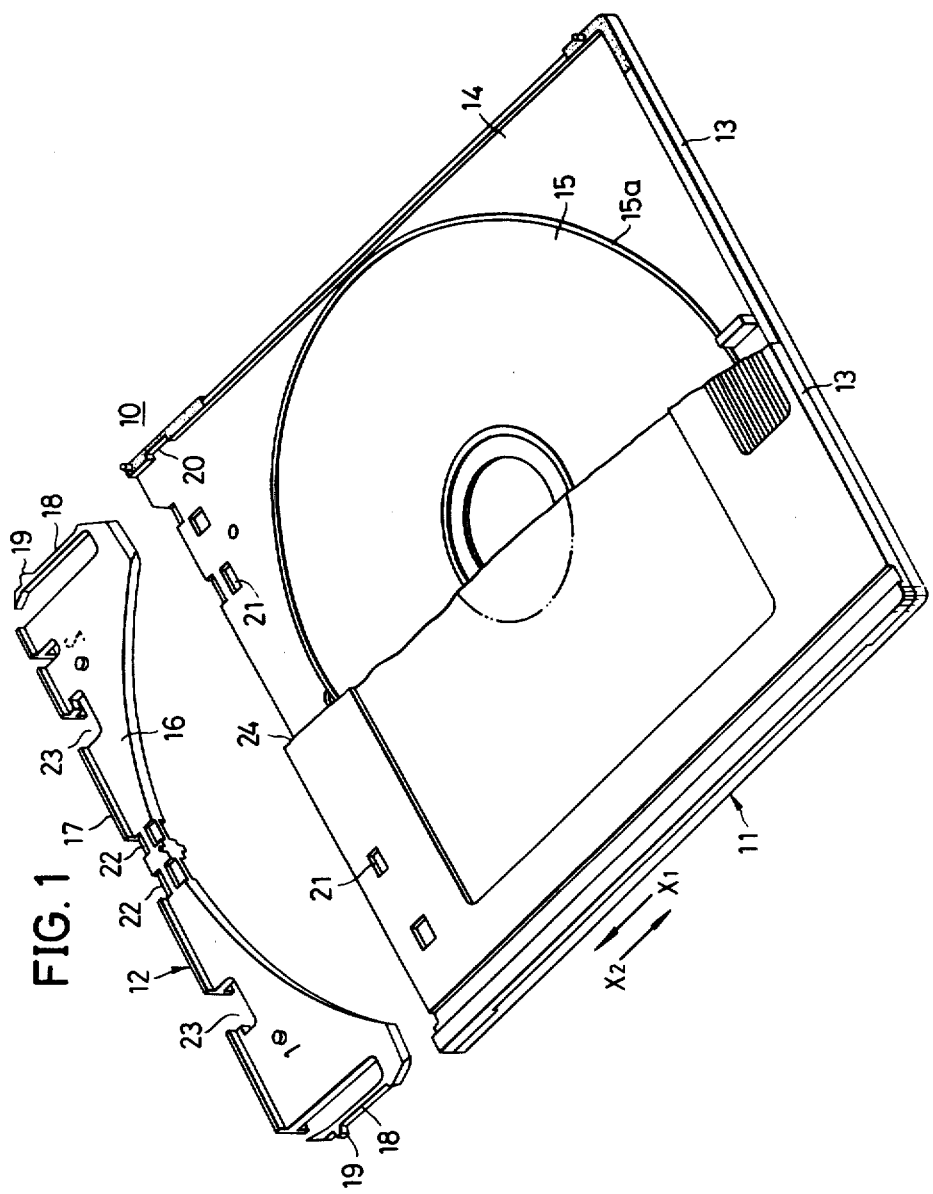
FIG. 1 is a perspective view, with a part cut away and disassembled, showing an example of a disc case which operates together with a rotary recording medium reproducing apparatus according to the present invention.

In FIG. 1, a disc case 10 comprises a jacket 11 and a lid plate 12. The jacket 11 is assembled from a pair of jacket halves 13, and comprises a flat cavity or space 14 therein. This space 14 is open at an opening 24 at the front side of the jacket 11, and accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, projections 19 of the engaging arms 18 engage into depressions 20, and thus, the lid plate 12 engages with the jacket 11.

Figure 2:
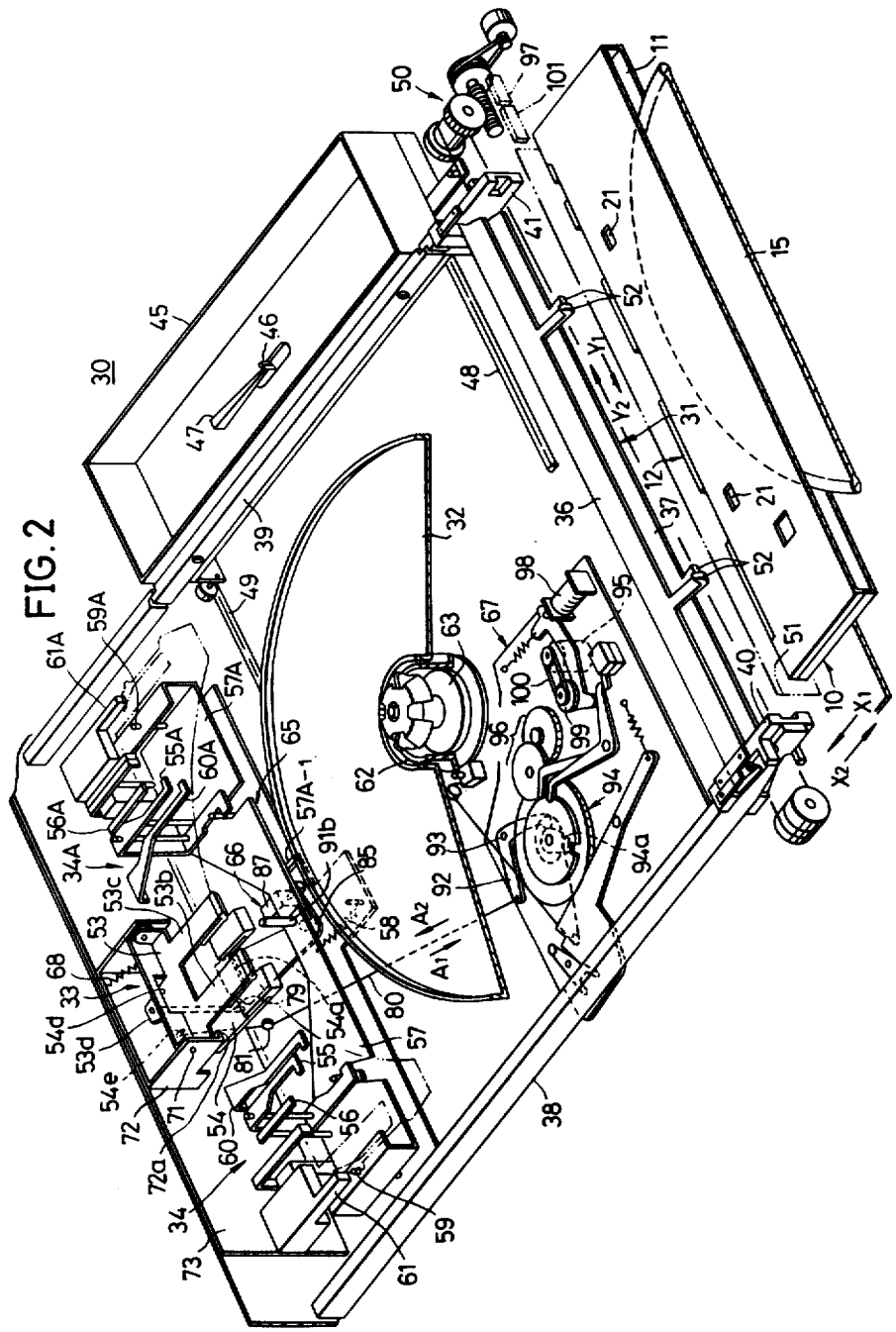
FIG. 2 is a perspective view, with a part cut away, showing the inner construction of a rotary recording medium reproducing apparatus according to the present invention.

As shown in FIG. 2, a reproducing apparatus 30 substantially comprises a jacket opening enlarging mechanism 31, a turntable 32 for rotating the disc 15 positioned thereon, a disc clamping mechanism 33 for clamping the disc 15, a lid plate locking mechanisms 34 and 34A for locking the lid plate 12, and the like.

The jacket opening enlarging mechanism 31 consists of upper and lower beams 36 and 37 extending in directions of arrows Y1 and Y2, and sliders 40 and 41 which are respectively fixedly inserted into guide rails 38 and 39, to support both ends of the respective beams 36 and 37 and to move along the guide rails 38 and 39. The jacket opening enlarging mechanism 31 is guided by the guide rails 38 and 39, and moves between the innermost part of the reproducing apparatus 30 and a disc case inserting opening 51 provided at the frame of the reproducing apparatus 30, in the direction of arrows X1 and X2.

A pickup carriage 45 is provided with a reproducing stylus 46 and a cantilever 47, and moves in the directions of the arrows Y1 and Y2 along a pair of guide rails 48 and 49.

Upon reproduction of the disc 15, the disc case 10 is inserted through the inserting opening 51 of the reproducing apparatus 30, by inserting the disc case 10 with the side of the lid plate 12 into the direction of the arrow X1.

When the disc case 10 is inserted into the reproducing apparatus 30 in the above described state, the jacket opening enlarging mechanism 31 is pushed and moved in the direction of the arrow X1. When the enlarging mechanism 31 moves, the upper and lower beams 36 and 37 rotate, and enlarging fingers 52 thus move upwards and downwards to mutually separate from each other. Accordingly, the tip ends of the enlarging fingers 52 engage with engaging windows 21 of the jacket 11, and enlarge the front part of the upper and lower jacket halves 13 upwards and downwards, to enlarge the opening 24.

When the disc case 10 is inserted into the innermost part of the reproducing apparatus 30 together with the enlarging mechanism 31 through the upper side of the turntable 32, upper and lower clamp arm members 53 and 54 of the disc clamping mechanism 33 clamps a groove guard 15a of the disc 15, as will be described hereinafter.

Accompanied by the insertion of the disc case 10, locking fingers 55 and 55A relatively enter inside L-shaped cutouts 23 of the lid plate 12, and the rim portion 17 accordingly pushes contact fingers 56 and 56A. When the contact fingers 56 and 56A are pushed by the lid plate 12, left and right main levers 57 and 57A respectively rotate in counterclockwise and clockwise directions about shafts 59 and 59A, against a force exerted by a spring 58, and then locked as will be described hereinafter. Due to the above rotations of the main levers 57 and 57A, the locking fingers 55 and 55A respectively rotate so as to separate from each other towards the left and right hand sides. Accordingly, the locking fingers 55 and 55A enter within the cutouts 23, to lock the lid plate 12. Therefore, the lid plate 12 is locked and held at the innermost part of the reproducing apparatus 30, in a state where the lid plate 12 is placed onto support fingers 60 and 60A.

Furthermore, engagement releasing members 61 and 61A enter inside the openings on the right and left sides of the disc case 10, and push the sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11.

Figure 3:
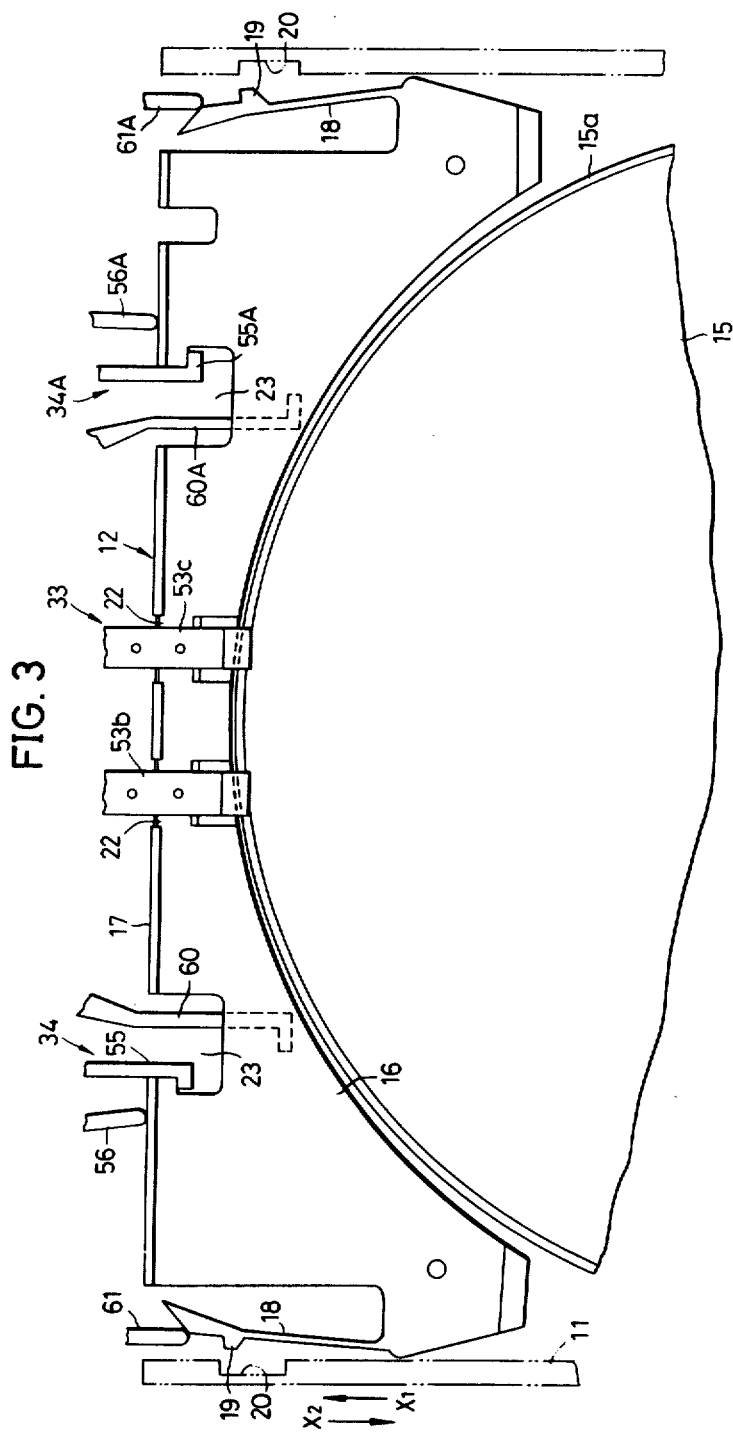
FIG. 3 is a plan view showing a state where a rotary recording medium is clamped, together with a state where a lid plate is locked.

Hence, when the disc case 10 is pushed into the final position, the connection of the lid plate 12 with respect to the jacket 11 is released, and the lid plate 12 becomes locked by the locking fingers 55 and 55A, as indicated by the two-dot chain line in FIGS. 2 and 3. Thus, the disc 15 is in a clamped state.

Next, the jacket 11 is pulled out in the direction of the arrow X2. Since the lid plate 12 and the disc 15 are respectively locked and held as described above, only the jacket 11 moves in the direction of the arrow X2, leaving behind the lid plate 12 and the disc 15. Accompanied by this operation in which the jacket 11 is pulled out from the reproducing apparatus 30, the lid plate 12 and the disc 15 are relatively pulled out from the jacket 11. In a state where the jacket 11 is separated from the enlarging mechanism 31 and is completely pulled out from the reproducing apparatus 30, the disc 15 is supported horizontally at a position directly above the turntable 32, by the clamping mechanism 33 and a support structure 62 which is in a raised position.

When a play operation is performed, the disc 15 is lowered and placed onto the turntable 32, and is clamped. In addition, the disc 15 is rotated towards a clockwise direction together with the turntable 32 by a motor 63.

Moreover, the carriage 45 is moved by a moving mechanism 50 in the direction of the arrow Y1 from a waiting position, to reproduce the information signal by the reproducing stylus 46 which relatively scans the recording surface of the disc 15.

Next, an operation in which the disc 15 is recovered from within the reproducing apparatus 30, will now be described.

Upon completion of the reproducing operation, the disc 15 is pushed upwards by the support structure 62. The disc 15 which is pushed up, is clamped by the disc clamping mechanism 33.

Upon recovering of the disc 15, an empty jacket 11 is again inserted into the reproducing apparatus 30 through the inserting opening 51, with the opening of the jacket 11 first. Thus, the enlarging mechanism 31 is pushed by the jacket 11 and moves in the direction of the arrow X1, to enlarge the opening 24 of the jacket 11. As the jacket 11 is inserted towards the direction of the arrow X1, the disc 15 is relatively inserted into the jacket 11 through the opening 24 of the jacket 11.

When the jacket 11 is inserted into the innermost position inside the reproducing apparatus 30, the disc 15 becomes completely incased within the jacket 11, and furthermore, the locked lid plate 12 is relatively inserted into the opening 24 of the jacket 11 to close the opening 24 of the jacket 11.

In addition, the lock with respect to the main levers 57 and 57A are released, and the main levers 57 and 57A rotationally return by following the movement of the jacket 11 which is pulled out in the direction of the arrow X2, and hence the locking mechanisms 34 and 34A are disconnected from the lid plate 12.

Therefore, when the jacket 11 is pulled out in the direction of the arrow X2, the lid plate 12 then moves in the same direction together with the jacket 11, and the disc 15 is pushed by the lid plate 12 and forcibly pushed out in the direction of the arrow X2 by the holding part. Accordingly, the disc 15 separates from the reproducing apparatus 30 to be recovered within the disc case 10.

Next, description will be given with respect to the construction and operation of a mechanism part, that is, the disc clamping mechanism 33 and the related parts, which form an essential part of the reproducing apparatus according to the present invention, by referring to FIGS. 4 through 7.

In relation to the above disc clamping mechanism 33, an operating mechanism 65 which operates in response to the insertion of the disc case 10 into the reproducing apparatus 30 to operate the disc clamping mechanism 33, and a locking mechanism 66 which locks the operating mechanism 65 at a final operating position, are respectively provided in the reproducing apparatus 30.

The clamp arm members 53 and 54 respectively have U-shaped cutouts 53a and 54a therein. These clamp arm members 53 and 54 respectively have a pair of clamp arms 53b and 53c, and 54b and 54c, and are axially supported in common inside a support bracket 72, to pivot about pins 71. The support bracket 72 is fixed onto an L-shaped bracket 73 which is fixed at the innermost part of the reproducing apparatus 30. The above clamp arms 53b and 54b, and the clamp arms 53c and 54c are in a positional relationship opposing each other in a vertical direction.

In addition, a projecting part 53d which passes through an opening 54d of the lower clamp arm member 54, is provided at the rear part side of the upper clamp arm member 53. A pin 79 is embeddedly provided on the lower surface of the above projecting part 53d.

The lower clamp arm member 54 is of an L-shape in side view, and has the opening 54d and a lug 54e both formed in a vertical wall of the clamp arm member 54. Between the lug 54e and a lower clamp arm member rotating mechanism 67 described hereinafter, a wire 80 is stretched is a state guided by a pulley 81. In the above mechanism 67, an L-shaped clamp control lever 92 having one arm to which the wire 80 is connected, is axially supported to pivot about a pin 93 provided on the chassis in a manner such that the other arm of the clamp control lever 92 opposes a cam 94a of a cam-gear structure 94. This cam-gear structure 94 is rotated by a motor 95 by way of reduction gears 96.

When the disc 15 is not clamped by the disc clamping mechanism 33, that is, during a non-clamping state, the clamp control lever 92 is rotated towards the clockwise direction and the lower clamp arm member 54 is rotated towards the downward direction. The above lower clamp arm member 54 is maintained at the above rotated position, due to the own weight of the member 54 and a spring force exerted by a coil spring 68 which is stretched between the lower clamp arm member 54 and the L-shaped bracket 73.

The operating mechanism 65 consists of the above pair of main levers 57 and 57A. The tip end sides of the main levers 57 and 57A are connected by a connection pin 91. The connection pin 91 consists of a lower projecting pin 91a and an upper projecting pin 91b which forms an essential part of the apparatus according to the present invention. These lower and upper projecting pins 91a and 91b operate together with a rib 85c and the lower clamp arm member 54 as will be described hereinafter. Moreover, the main lever 57A has a bent arm 57A-1 formed at a position opposing an adapter 90.

The locking mechanism 66 consists of an L-shaped locking arm member 85 and a self-locking mechanism structure 87.

The L-shaped locking arm member 85 is pivotally supported on a pin 86 embeddedly provided in a floor of the L-shaped bracket 73. One arm 85a of the locking arm member 85 is connected to the self-locking mechanism. On the other hand, another fan-shaped arm 85b has the rib 85c for engagement provided at an intermediate part thereof, and an engagement cam 85d provided at the tip end thereof.

A self-locking mechanism structure 87 is fixed at a predetermined position on the floor of the L-shaped bracket 73. This self-locking mechanism structure 87 is adapted to lock a rod 88 when pushed in the direction of the arrow X1, and to unlock the rod 88 when pushed again in the same direction. A coil spring 89 for restoring is fitted around the rod 88. Further, the connecting adapter 90 which connects with the above arm 85a, is fixed at the tip end of the rod 88.

In a non-clamping state wherein the disc 15 is not clamped, the main levers 57 and 57A are in states respectively rotated towards the clockwise and counterclockwise directions due to the operation of the spring 58. Further, the locking arm member 85 is in a state rotated towards the clockwise direction.

Next, description will be given with respect to the operations of the above mechanisms 35, 65, 66, and 67 upon loading of the disc 15, reproduction of the disc 15, and recovering of the disc 15.

Upon insertion of the disc case 10, a load/eject button 97 is pushed. Responsive to this operation, a plunger solenoid 98 is energized, and the motor 95 begins to rotate. When the plunger solenoid 98 is energized, a gear 99 meshes with the reduction gears 96. The gear 99 rotates clockwise by means of the motor 95 by way of a belt 100. The rotation of the gear 99 is transmitted by way of the reduction gears 96 to the cam-gear structure 94, which thereby rotates counterclockwise at a reduced speed. Due to the rotation of the cam-gear structure 94, the cam 94a rotates the clamp control lever 92 counterclockwise, and hence, the wire 80 is pulled in the direction of an arrow A1 to cause the lower clamp arm member 54 to rotate counterclockwise. The lower clamp arm member 54 is applied with a large torque in the counterclockwise direction by the wire 80, and is pressed against a bent portion 72a of the support bracket 72 to limit the rotation thereof in the counterclockwise direction. Accordingly, the lower clamp arm member 54 is held rigidly at a rotational position indicated by two-dot chain lines in FIGS. 5 and 6, where the clamp arms 54b and 54c extend horizontally.

When the disc clamping mechanism 33 is in the above described state, the disc case 10 is inserted into the reproducing apparatus 30.

When the disc case 10 is inserted to the final position of the reproducing apparatus 30, the main levers 57 and 57A are pushed by the lid plate 12 and rotated as shown in FIG. 6, and the lid plate 12 and the outer peripheral groove guard 15a of the disc 15 enter between the upper and lower clamp arms 53b, 53c, 54b, and 54c in succession, and immediately thereafter, the upper clamp arm member 53 is locked at a position capable of clamping the groove guard 15a.

That is, due to the rotation of the main lever 57A, the bent arm 57A-1 pushes the adapter 90 in the direction of the arrow X1. Moreover, the adapter 90 is locked at a position shown in FIG. 6 due to the operation of the self-locking mechanism structure 87. The L-shaped locking arm member 85 rotates in accordance with the movement of the adapter 90, and the rib 85c engages with the lower projecting pin 91a which has moved towards the direction of the arrow X1, to lock the main levers 57 and 57A. The pin 79 of the upper clamp arm member 53 is locked by the engagement cam 85d of the locking arm member 85, and the upper clamp arm member 53 is accordingly locked at a horizontal rotational position. Therefore, the outer peripheral groove guard 15a of the disc 15 is clamped between the upper and lower clamp arm members 53 and 54, as indicated by the two-dot chain line in FIG. 6.

When the jacket 11 is pulled out after the above described operations are performed, the disc 15 is positively left within the reproducing apparatus 30, and only the jacket 11 is pulled out from the reproducing apparatus 30.

After the jacket 11 is pulled out of the reproducing apparatus, a play button 101 is pushed. Responsive to this operation, the motor 95 begins to rotate in a reverse direction, and hence the cam-gear structure 94 rotates clockwise up to the original position indicated in FIG. 2. As a result of the rotation of the cam-gear structure 94, the clamp control lever 92 rotates clockwise thereby to feed out the wire 80 in the direction of an arrow A2. Accordingly, the lower clamp arm member 54 rotates clockwise as indicated by a solid line in FIG. 6, to release the clamping with respect to the disc 15. As another result of the rotation of the cam-gear structure 94, the support structure 62 moves downwards to place the disc 15 onto the turntable 32.

Upon recovering of the disc 15, the load/eject button 97 is pushed again. Responsive to this operation, the motor 97 starts and the cam-gear structure 94 rotates counterclockwise. Hence, the support structure 62 moves upwards, and the lowerclamp arm member 54 rotates to the position indicated by the two-dot chain line in FIG. 6, similarly as in the preceding disc loading mode. Accordingly, the disc 15 is supported above the turntable 32 and clamped at the groove guard 15a thereof.

When the empty jacket 11 is inserted to the innermost position inside the reproducing apparatus 30, the adapter 90 is pushed to be released from the self-locked state. Hence, each member returns from a state indicated in FIG. 7 to the original state indicated in FIG. 4. Particularly, the clamp arm member 53 is released from the locked state. Accordingly, the groove guard 15a slips out from between the upper and lower clamp arms, and the disc 15 separates from the reproducing apparatus 30 to be recovered within the jacket 11.

Next, description will be given with respect to the essential part of the apparatus according to the present invention. The lower clamp arm member 54 is in a downwardly rotated position indicated by a solid line in FIG. 6 due to the own weight of the lower clamp arm member 54 and the operation of the spring 68, during times other than when the disc 15 is loaded and the disc 15 is recovered. That is, the lower clamp arm member 54 is in the above state when the power is cut off with respect to the reproducing apparatus 30 (during transportation, for example), during the time until the load-/eject button 97 is operated in a state where the power switch of the reproducing apparatus 30 is turned ON, and during a reproducing operation. Accordingly, the lower clamp arm member 54 is maintained at the downwardly rotated position, during the time periods in which there is a possibility for an external shock to be applied against the reproducing apparatus 30. Furthermore, the lower clamp arm member 54 is maintained at the above rotated position regardless of the position of the reproducing apparatus 30, since the spring 68 is used in the above described manner.

The upper projecting pin 91b of the above connection pin 91 is positioned between the pair of left and right clamp arms 54b and 54c of the lower clamp arm member 54 in the plan view as shown in FIG. 4, and projects upwards by a distance h. This distance h is selected so that the top part of the projecting pin 91b is at a position higher than the cutout 54a when the lower clamp arm member 54 is at the downwardly rotated position, and at a position lower than the cutout 54a when the member 54 is at the horizontal rotational position. Moreover, the above distance h is also selected so that the lower clamp arm member 54 can rotate between the downwardly rotated position and the horizontal rotational position without colliding with the upper projecting pin 91b, when the upper projecting pin 91a is at the restored position indicated in FIGS. 1, 4, and 6. That is, the upper projecting pin 91b and the lower clamp arm member 54 are arranged with a positional relationship so that a rotational locus L on an inner part end surface 54a-1 of the cutout 54a does not intersect with the upper projecting pin 91b upon rotation of the above lower clamp arm member 54.

The main levers 57 and 57A are maintained at the restored positions due to the operation of the spring 58. However, since the force exerted by the spring 58 is small for the reason described above, there are cases where the connection pin 91 rotates towards the direction of the arrow X1 against the force exerted by the spring 58 when a shock is applied to the reproducing apparatus 30. In the conventional reproducing apparatus, locking screws were provided to prevent the main levers 57 and 57A from rotating due to a shock applied against the reproducing apparatus. On the other hand, in the reproducing apparatus according to the present invention, even when the external shock is large, the upper projecting pin 91b hits against the inner end surface 54a-1 of the cutout 54a in the lower clamp arm member 54 which is in the downwardly rotated position. Accordingly, the rotational movements of the main levers 57 and 57A are restricted at positions indicated by the two-dot chain lines in FIG. 6, that is, at positions on the front side before the lower projecting pin 91a is locked at the final position by the rib 85c. Hence, in the above described reproducing apparatus 30, the operating mechanism 65 is prevented from being locked at the final position by the locking mechanism 66 due to shock applied against the reproducing apparatus upon transportation. Moreover, even in a case where the reproducing apparatus 30 which is placed onto a table falls to the floor by an accident, the operating mechanism 65 is similarly prevented from being locked at the final position by the locking mechanism 66.

In addition, when the packaged reproducing apparatus 30 which has been transported is unpacked and placed onto a table and power is supplied to the reproducing apparatus 30 by turning the power source switch ON, the lower clamp arm member 54 rotates unto the horizontal rotated position and the cutout 54a recedes towards the upward direction from the upper projecting pin 91b, when the load/eject button 97 is operated to load the disc 15 into the reproducing apparatus 30. Hence, the upper projecting pin 91b is put into a state possible to move on the lower side of the lower clamp arm member 54 without hitting against the inner end surface 54a-1 of the cutout 54a of the lower clamp arm member 54. Accordingly, by inserting the disc case 10 into the reproducing apparatus 30, the operating mechanism 65 is pushed by the disc case 10 and locked at the final position by the locking mechanism 66. The disc clamping mechanism 33 and the lid plate locking mechanisms 34 and 34A accordingly operate, due to the operation of the operating mechanism 65.

Furthermore, a bent piece formed by bending a part of the main lever 57a towards the upward direction, can be used instead of the upper projecting pin 91b.

Moreover, a locking part can be provided on the lower clamp arm member 54 so that the locking part receives a part of the main levers 57 and 57A, when the lower clamp arm member is at the above described downwardly rotated position.

Further, the present invention is not limited to these embodiments, but carious variations and modifications may be made without departing from the scope of the present invention.

What is claimed is:

1. A rotary recording medium reproducing apparatus for reproducing a rotary recording medium accommodated within a case, said case comprising a jacket provided with a space for accommodating said rotary recording medium and an opening for allowing said rotary recording medium to go in and out of said jacket, and a lid member inserted through said opening of said jacket for closing said opening of said jacket, said rotary recording medium reproducing apparatus comprising:

an inserting opening through which said case is inserted;

a turntable for rotating said rotary recording medium;

lid member locking means and rotary recording medium clamping means provided at an innermost part of said reproducing apparatus at an opposite side from said inserting opening with respect to said turntable, said rotary recording medium clamping means consisting of an upper clamping member and a lower clamping member which is at a downwardly inclined rotated position upon non-clamping state and at a horizontal rotational position upon clamping state;

operating means pushed and displaced by said case inserted into said reproducing apparatus, for operating said lid member locking means and said rotary recording medium clamping means;

locking means for locking said operating means at a final displaced position; and a restricting mechanism constructed from a part of said lower clamping member of said rotary recording medium clamping means and a part of said operating means, for restricting the displacing movement of said operating means towards the final displaced position at an intermediate position when said lower clamping member is at the downwardly inclined rotated position.

2. A reproducing apparatus as claimed in claim 1 in which said restricting mechanism further has a spring member for supporting said lower clamping member at the downwardly inclined rotated position.

3. A reproducing apparatus as claimed in claim 1 in which said lower clamping member has an U-shaped cutout forming a pair of clamp arms, said operating means has an upper projecting pin projecting in an upward direction, and said restricting mechanism stops said upper projecting pin from moving by said U-shaped cutout.

4. A reproducing apparatus as claimed in claim 3 in which said upper projecting pin has a vertex part having a position which is higher than an innermost end surface of said U-shaped cutout when said lower clamping member is at the downwardly inclined rotated position, and has a height such that said vertex part is lower than said innermost end surface of said U-shaped cutout when said lower clamping member is at the horizontal rotational position.

5. A reproducing apparatus as claimed in claim 4 in which said upper projecting pin is of a height separated from a rotational locus of said innermost end surface of said U-shaped cutout upon rotation of said lower clamping member, when said operating means is at a position prior to displacement.

* * * * *